US008056119B2

(12) United States Patent
Gillet et al.

(10) Patent No.: US 8,056,119 B2
(45) Date of Patent: Nov. 8, 2011

(54) METHOD AND SYSTEM FOR CONTROLLING INTER-ZONE COMMUNICATION

(75) Inventors: Bruno Jean Gillet, Paris (FR); Bart Blanquart, Putte (BE)

(73) Assignee: Oracle America, Inc., Redwood City, CA (US)

( * ) Notice: Subject to any disclaimer, the term of this patent is extended or adjusted under 35 U.S.C. 154(b) by 817 days.

(21) Appl. No.: 12/110,073

(22) Filed: Apr. 25, 2008

(65) Prior Publication Data
US 2009/0271840 A1 Oct. 29, 2009

(51) Int. Cl.
*H04L 29/00* (2006.01)
(52) U.S. Cl. ........... 726/2; 726/1; 726/27; 713/182; 713/183; 713/184; 713/185; 713/186
(58) Field of Classification Search ........... 726/1, 2, 726/27; 713/182–186; 711/163–164
See application file for complete search history.

(56) References Cited

U.S. PATENT DOCUMENTS

| | | | | |
|---|---|---|---|---|
| 6,630,946 | B2 * | 10/2003 | Elliott et al. | 715/781 |
| 7,702,739 | B1 * | 4/2010 | Cheng et al. | 709/207 |
| 2002/0188869 | A1 * | 12/2002 | Patrick | 713/201 |

OTHER PUBLICATIONS

Blanquart, Bart; "Policy-enforcing data handling framework"; Published in Oct. 2004; Research Disclosure Journal, ISSN 0374-4353; The Book Barn, Westbourne, Hants, United Kingdom; (4 pages).
Nichols, Wayne and Blanquart, Bart; "Controlling the Movement of Sensitive data with Trusted Solaris Gateway"; published Nov. 4, 2004; http://onestop-stage/technocrat/archive/html/current.shtml; (4 pages).

* cited by examiner

*Primary Examiner* — Vivek Srivastava
*Assistant Examiner* — Helai Salehi
(74) *Attorney, Agent, or Firm* — Osha • Liang LLP

(57) ABSTRACT

A method for executing a target program that includes opening, in response to a request, a door between the source container and the global container, where the source container is controlled by the global container and the request specifies a target program. The method further includes sending the request to an access module located in the global container using the door, verifying that the request can be executed in a target container using a policy definition, where the target program is in the target container and the target container is controlled by the global container, logging in to the target container after the request has been verified, initiating a gateway within the target container in response to the login, setting an execution context of the gateway based on the policy definition, and executing the target program by the gateway, using the execution context, to generate a response to the request.

20 Claims, 11 Drawing Sheets

Chemin de confiance
IZA[BEL] console : Adding granted user...

User definition for application :   term.pub

Required fields
User Name:  [bjg]

Optional fields
Exec UID: [root]

Options enforcement
Forced options:  [-display ${OPTIONS}.0.0]
Granted options: [suntz, localhost]

Label/Zones enforcement
Source Label/Zone: [internal ssc]
Dest. Label/Zone: [public]

Privileges enforcements
Effective:  [basic]
Inherited:  [basic]
Permitted:  [basic]
Limit:      [basic]

[Export Policy]  [Save]          [Cancel]

| Field | Value |
|---|---|
| Program name | term.ts |
| Executable path | /usr/bin/xterm |
| Program MD5 | 0cd3ea9947b124c0eadd1c8d4ebea5c0 |
| Source container | Secret |
| Destination container | Top Secret |
| Forced options | -display ${OPTIONS}:0.0 |
| Granted options | |
| Execution UID | root |
| Execution privileges | |
| Granted entities | |

*Figure 8B*

| Entity | Source Container | Destination Container | Application: Command | Exec UID | Granted Options | Privileges |
|---|---|---|---|---|---|---|
| User A | Non-Global Container A | Non-Global Container E | term.pub: izarun -c term.pub -display ${OPTIONS}:0:0 | root | localhost suntzu | admin |
| User A | Non-Global Container C | Non-Global Container E | term.pub: izarun -c term.pub -display ${OPTIONS}:0:0 | root | localhost | root |
| User B | Non-Global Container A | Non-Global Container E | term.pub: izarun -c term.pub -display ${OPTIONS}:0:0 | usrname | localhost | basic |

*Figure 8C*

METHOD AND SYSTEM FOR CONTROLLING INTER-ZONE COMMUNICATION

BACKGROUND

In today's information age, security and administrative policies are used to control access to information. Conventional security mechanisms associate access permissions based on permission or confidentiality levels. For example, a security mechanism may include three hierarchical confidentiality levels: public, confidential, and top secret. Each application and piece of information is classified using one of the confidentiality levels. Further, each user is associated with a permission or clearance level, e.g., confidential.

With the permission level, the user is allowed to access information and/or programs classified at the same permission level as her permission level. Further, the user is allowed to access information and/or programs at a permission level (s) below her current permission level. For example, a user with a permission level of confidential may access information and/or programs classified as public. However, the user is not able to access information or programs classified as top secret. If the permission levels are tied to clearance levels, the user is allowed to access information at one of the levels of information that is of the same level or a hierarchically lower level. The user is not able to access information that is higher in the hierarchy of sensitivity levels. Further, the user is not able to access information that is in a different hierarchy altogether. Further, it is typically difficult to manage communications between containers in a granular fashion.

SUMMARY

In general, in one aspect, the invention relates to a method for executing a target program. The method includes opening, in response to a request, a door between the source container and the global container, wherein the source container is controlled by the global container and the request specifies a target program, sending the request to an access module located in the global container using the door, verifying that the request can be executed in a target container using a policy definition, wherein the target program is in the target container and wherein the target container is controlled by the global container, logging in to the target container after the request has been verified, initiating a gateway within the target container in response to the login, setting an execution context of the gateway based on the policy definition, and executing the target program by the gateway, using the execution context, to generate a response to the request.

In general, in one aspect, the invention relates to a computer readable medium comprising executable instructions to perform a method when executed by a processor, the method includes opening, in response to a request, a door between the source container and the global container, wherein the source container is controlled by the global container and the request specifies a target program, sending the request to an access module located in the global container using the door, verifying that the request can be executed in a target container using a policy definition, wherein the target program is in the target container and wherein the target container is controlled by the global container, logging in to the target container after the request has been verified, initiating a gateway within the target container in response to the login, setting an execution context of the gateway based on the policy definition, and executing the target program by the gateway, using the execution context, to generate a response to the request.

In general, in one aspect, the invention relates to a system that includes a hardware platform comprising a processor, and a global container executing on the hardware platform, wherein the global container comprises a first container, a second container, and an access module, wherein the second container comprises a target program, wherein the first container comprises a source program configured to send a request for the target program to the access module, wherein the access module, using a policy definition, is configured to enable the target program to process the request, wherein the policy definition comprises at least one selected from a group consisting of a program definition and an entity definition.

Other aspects of the invention will be apparent from the following description and the appended claims.

BRIEF DESCRIPTION OF DRAWINGS

FIGS. 2-5 show graphical user interfaces in accordance with one or more embodiments of the invention.

FIGS. 8A-8C show a second example in accordance with one or more embodiments of the invention.

DETAILED DESCRIPTION

Figure 1:
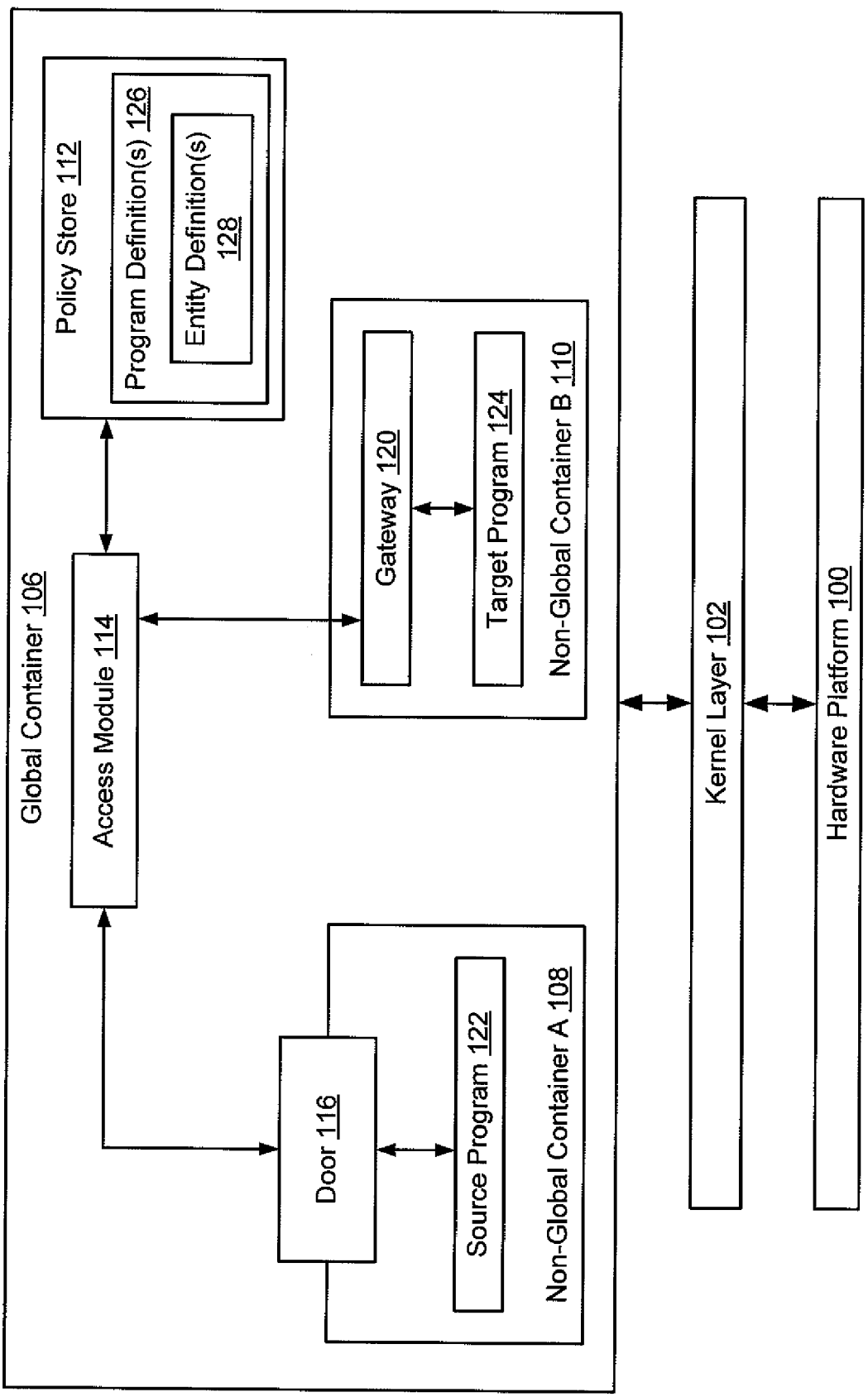
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for executing a target program. More specifically, embodiments of the invention relate to a method and system for an entity in one container to request execution of a target program in another container, where the execution is controlled by an access module using program and entity definitions.

In one embodiment of the invention, the invention may be implemented on a system having operating system-level virtualization. Operating system-level virtualization enables a kernel of an operating system to concurrently execute multiple isolated execution environments. To processes executing in an execution environment, the execution environment appears and functions as a single server. Such execution environments may be referred to as containers. For the purposes of this application, the use of the term container refers to the aforementioned generic definition, and is not restricted to any specific implementation.

FIG. 1 shows a system in accordance with one or more embodiments of the invention. More specifically, FIG. 1 shows a system having a container architecture in accordance with one or more embodiments of the invention. The system includes a hardware platform (100). The hardware platform (100) may include one or more of the following components: physical resources (i.e., network interfaces, network devices, interfaces to data repositories, etc.) of the system, core operating system services, remote administering monitoring services, platform administrative services, etc. The hardware platform (100) interfaces with the global container (106), which operates on a kernel layer (102). The kernel layer (102) supports container management functions; typically including functionality to administer one or more containers (e.g., global container (106), non-global container A (108), non-global container B (110)). The kernel layer (102) may also include support for a set of services and resources that allow full functionality of the container architecture.

In one or more embodiments of the invention, each non-global container (e.g., non-global container A (108), non-global container B (110)) provides an isolated environment for executing applications. Processes executing in a given container (e.g., source program (122), gateway (120) (discussed below), target program (124)) are prevented from monitoring or interfering with other activities in the system. Access to other processes, network interfaces, file systems, devices, and inter-process communication facilities is restricted to prevent interaction between processes in different containers. Privileges are specific rights that can be granted to a requesting user but not linked by default to an execution user identification (UID) and may be found in various operating systems. In one embodiment of the invention, privileges may be defined as the delegation of an authority over a computer or software executing on the computer system. The privilege grants permission to perform an action on the computer or the software executing on the computer. Specific privileges may be granted to or removed from applications (i.e., software executing on the computer) and by extension to or from users. The privileges available within a container are restricted to prevent operations with system-wide impact.

In one or more embodiments of the invention, the non-global containers (e.g., non-global container A (108), non-global container B (110)) are typically configured and administered using utilities that are available within the global zone, which may interact with the kernel layer (102) for some aspects of the configuration. These utilities may allow an administrator to specify the configuration details of a non-global container, install file system contents (including software packages) into the container, manage the runtime state of the container, etc. In one embodiment of the invention, the containers (e.g., global and non-global) executing on a single operating system image. In one or more embodiment of the invention, the containers are implemented within the operating system (e.g., the Solaris™ Operating System and the Solaris™ Trusted Extension). Solaris™ is a trademark of Sun Microsystems, Inc.

In one or more embodiments of the invention, the access module (114) is configured and administered using a configuration file and information stored in the policy store (112). The access module (114) provides a single point of administrative access within the global container (106). By executing the access module (114) in the global container (106), programs and/or entities within the non-global containers (e.g., 108, 110) do not have direct access to the access module (114).

Figure 2:
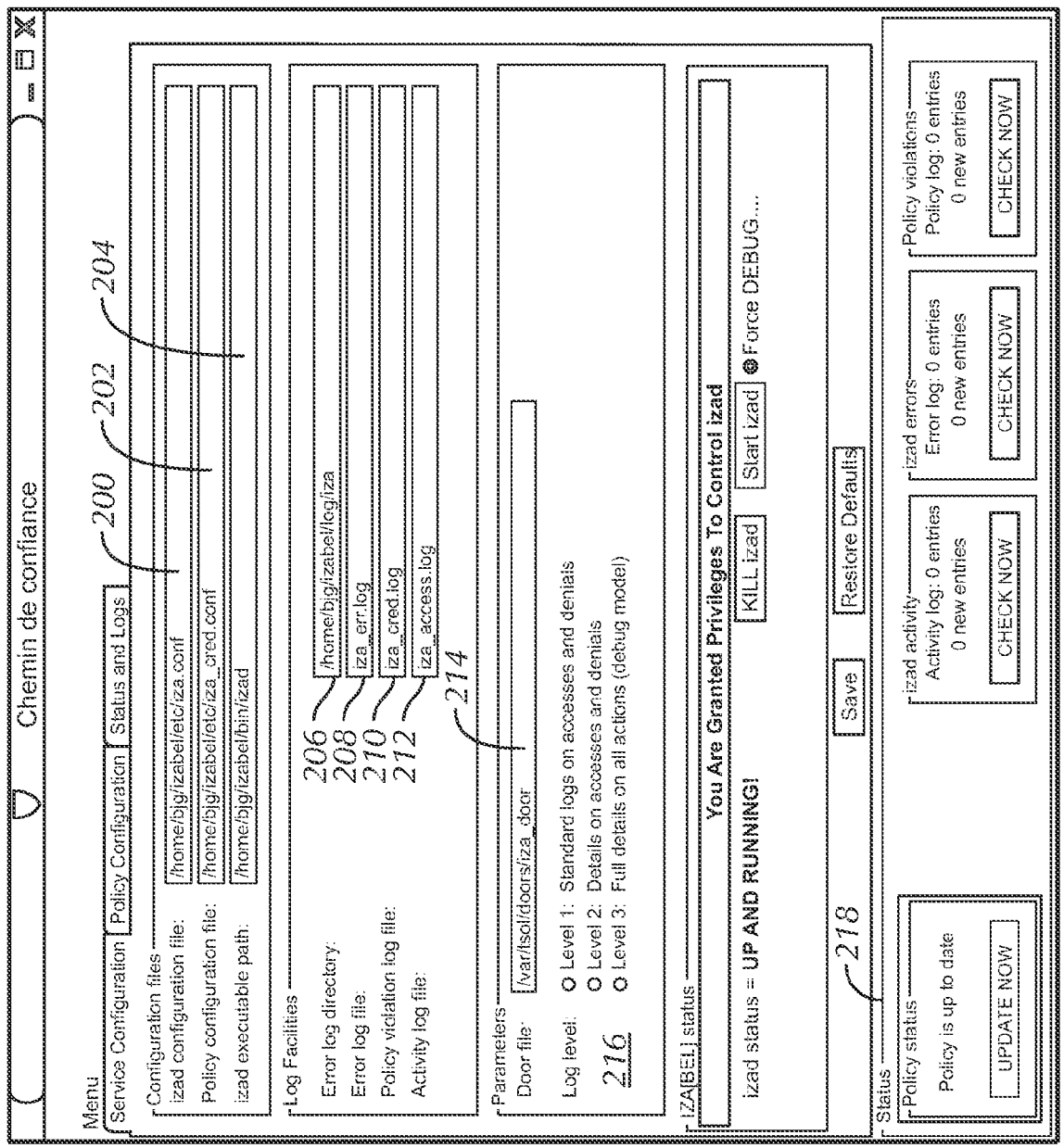

In one embodiment of the invention, the policy store (112) includes one or more program definitions (126). In one embodiment, the program definitions (126) specify rules for granting rights to execute a program in one or more global or non-global containers. Examples of program definitions may be found in FIGS. 3 and 8B. In one embodiment of the invention, each program definition (126) may include (or be associated with) one or more entity definitions (128). In one embodiment of the invention, each entity definition specifies entity (e.g., user, group of users, users associated with a role, a process, a program, etc.) access rules with respect to a given program. Examples of entity definitions may be found in FIGS. 4, 5, and 8C. In one embodiment of the invention, the configuration file (not shown) includes the configuration parameters for the access module (114). An example of the content in the configuration file is shown in FIG. 2.

Continuing with the discussion of FIG. 1, enclosing the previously mentioned non-global containers (108, 110) is a global container (106). The global container (106) always exists, and acts as the "default" or "master" container in which all processes run if no non-global containers have been created or are present and through which any non-global container can be created or managed. In one or more embodiments of the invention, communication between processes/entities in containers (106, 108, or 110), may be done through a door (116). A door may be opened by a source program (122), which then may post a request to the access module (114) and wait for the access module (114) to process the request.

A door is an inter-process communication mechanism. A program wishing to offer a service using a door informs the system of its intent, and how the door will be serviced. The program can then advertise its door handle, for example, by creating a special file. A door client can then use a door handle, which it can find using the special file, to invoke the service. In the instant case, the code obtained via the door may only be executed after the access module grants permission to execute the code. Those skilled in the art will appreciate that while the door implementation has been described with respect to the use of a special file, the functionality of the door may be implemented using other mechanisms.

Figure 8A:
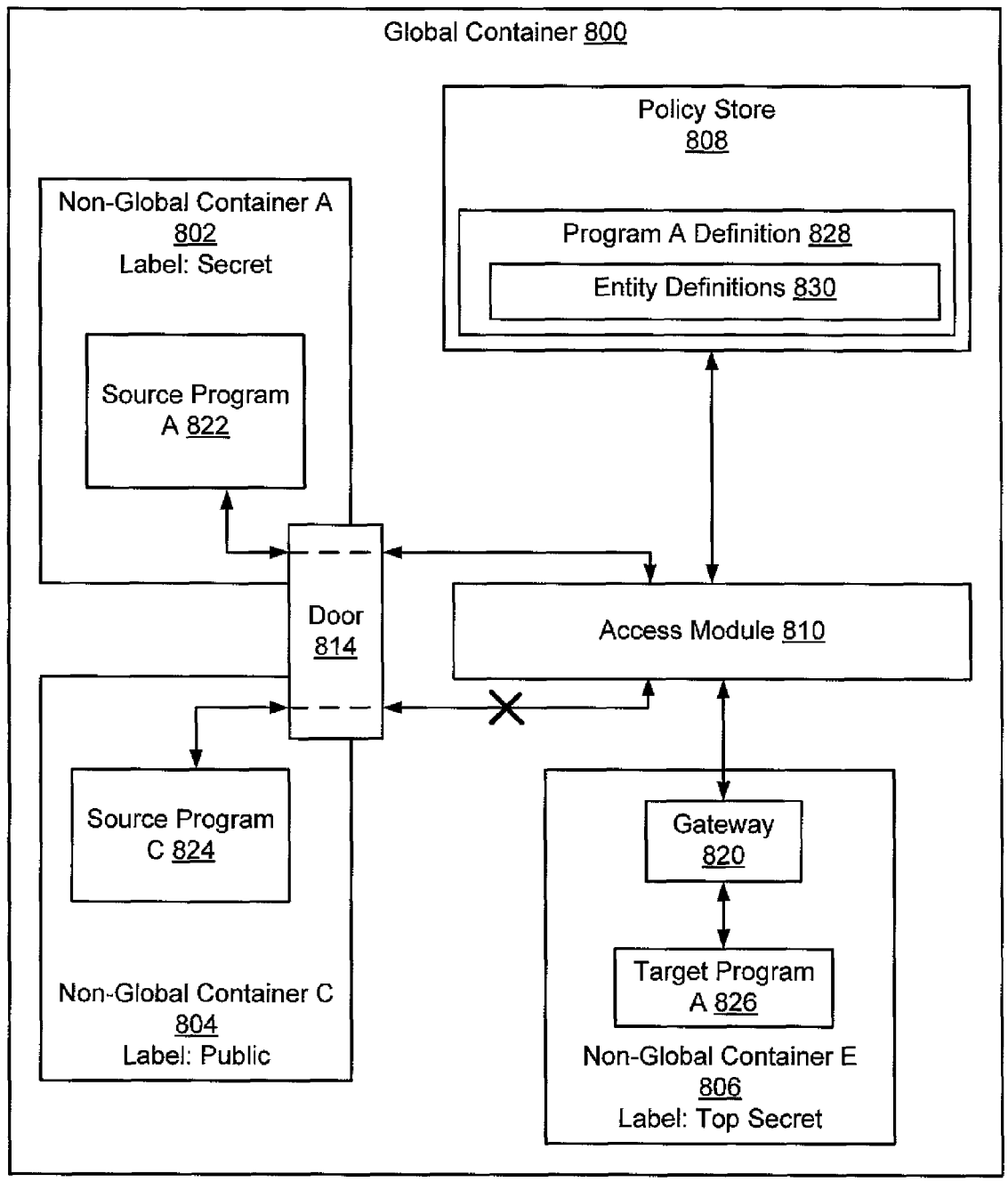

In one embodiment of the invention, each non-global container (108, 110) is associated with a sensitivity label (e.g., top secret, secret, etc.). In one embodiment of the invention, the zone name is used by the access module (114) to determine whether entities requesting execution (also referred to as the requesting entit(ies)) from a container may be granted rights to execute the program in the target container. In an alternative embodiment of the invention, the label associated with the non-global container is used by the access module (114) to determine whether entities requesting execution from a container may be granted rights to execute the program in the target container. An example of using labels to restrict access to a container is shown in FIGS. 8A and 8B. Those skilled in the art will appreciate that programs, on behalf of an entity (or entities) may request execution of a program in a target container. In such cases, the access module (114) determines whether the requesting program may request execution of the program on the target container based on the entity (or entities) on behalf of which the program is sending the request.

FIGS. 2-5 show graphical user interfaces (GUIs) in accordance with one or more embodiments of the invention. The GUIs are not intended to limit the scope of the invention. Turning to FIG. 2, FIG. 2 shows a GUI for configuring the access module (114) in accordance with one or more embodiments of the invention. The GUI provides data entry fields for specifying: (i) the pathname of the configuration file (200); (ii) the pathname policy definitions (referring to the policy configuration file in FIG. 2) (202); (iii) the pathname for the access module executable (204) (i.e., the location of the executable image of the access module within the global container); (iv) the pathname to the error log directory (206), which may include error log files (208) (e.g. files including information about errors that occurred within the global and non-global containers related to the access module), violation log files (210) (e.g., a listing of access requests, which were denied by the access module), and/or activity log files (212) (e.g., a listing of all activity within the global and non-global containers related to the access module); (v) a pathname for the door (214) (i.e., the file corresponding to the door, which may be accessible via a loop-back read only mount; and (vi) a log level (216) for the activities that occur within the global and non-global containers related to the access module (e.g., level 1—standard logs on access and details, level 2—details on accesses and denials, level 3—full details on all actions (debug mode)). The GUI in FIG. 2 may specify the status of the access module (218). The status (218) may include options such as initiating the access module; interrupting and ending the access module processing; obtaining status of the access module policy (e.g., are the policy definitions up to date), activity, errors and violations; saving the access module information and restoring the access module defaults.

Figure 3:
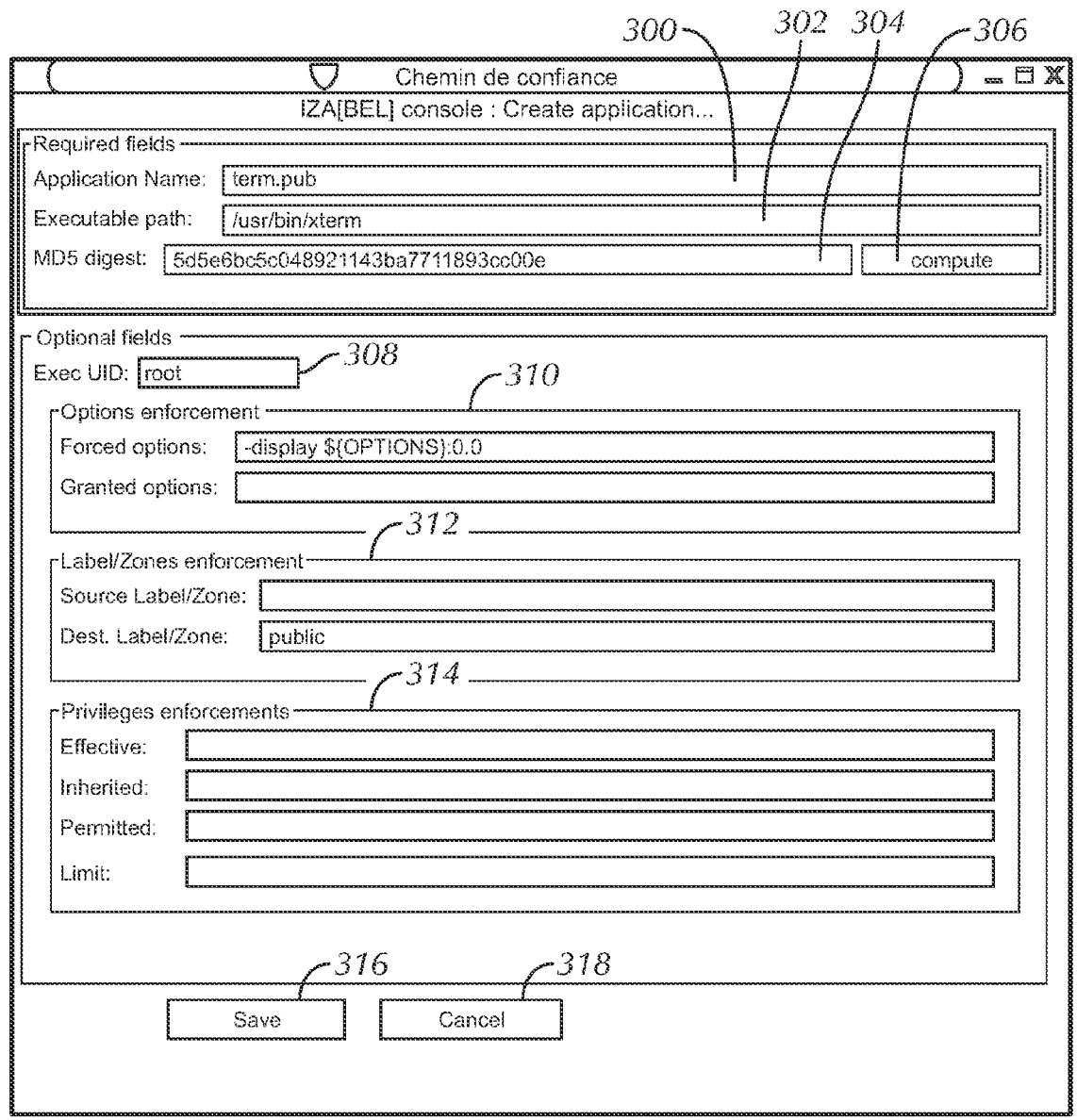

FIG. 3 shows a GUI for creating a program definition in accordance with one or more embodiments of the invention. The program definition includes required fields and optional fields. In one embodiment of the invention, the required fields include: (i) the program (application) name (300), (ii) the pathname to the program executable (302) and (iii) a checksum digest (e.g., MD5 digest, SHA-1, etc.) (304) of the program executable. The checksum digest is used to verify the integrity of the program executable. The GUI, as shown in FIG. 3, may include functionality (e.g., 306) to generate the checksum digest once the pathname for the program executable is specified.

In one or more embodiments of the invention, the optional fields include: (i) execution user identification (308), which specifies the execution user identification assigned to the target programs at run-time; (ii) options enforcement (310), including forced options (i.e., options that are associated with all commands executed by the program) and granted options (i.e., options that may be associated with commands executed by the program); (iii) label/zone enforcement (312), which defines the labels or zones for the source and target (also referred to as the destination) (discussed below); and (iv) privileges (314) associated with the entities executing the target program. In one embodiment of the invention, the privileges correspond to the privileges within the non-global container in which the program is executing. By entering data into this GUI and saving (316) the information, a new program (application) is added (i.e., the access module may subsequently control access to the program). If the user would like to exit this GUI without saving any information for a program, they may select to cancel (318).

In the GUI shown in FIG. 3, the application is "term.pub" configured to execute in a non-global container with a "public" label. The application executes using a "root" execution user identification (UID). Further, all commands executed by the "term.pub" include the forced option "-display ${OPTIONS}:0.0. The ${OPTIONS} keyword is a reserved keyword used in the policy to configure access rules. This keyword requires options specified by the requesting user at the time of the request to be substituted to this keyword. If no granted options are specified, any options can be transmitted by the requesting user.

Figure 4:
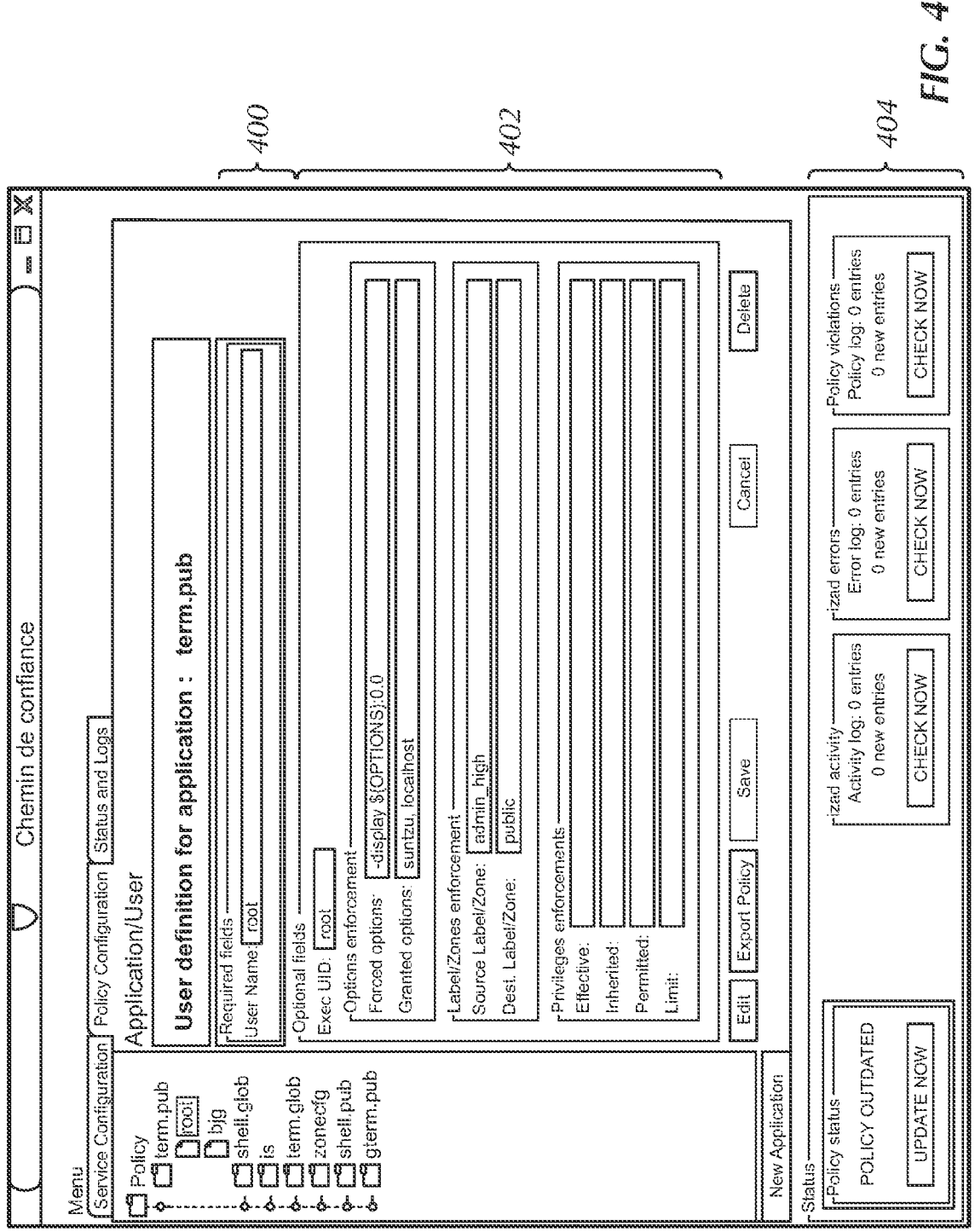

FIG. 4 shows a GUI for configuring an entity definition in accordance with one or more embodiments of the invention. The entity definition includes required fields (400) and optional files (402). In one embodiment of the invention, the required fields (400) include the user name. In one embodiment of the invention, the optional fields (402) include: (i) execution user identification, which specifies the execution user identification assigned to the target program at run-time; (ii) options enforcement, including forced options (i.e., options that are associated with all commands executed by the program) and granted options (i.e., options that may be associated with commands executed by the program); (iii) label/zone enforcement, which defines the labels or zones for the source and target (also referred to as the destination) (discussed below); and (iv) privileges associated with the entities executing the program. In addition, the GUI shown in FIG. 4 includes a status panel (404), which includes the status of the program with which the entity definition is associated.

In the GUI shown in FIG. 4, the entity definition is for the application "term.pub" defined in FIG. 3. The user name is "root." With respect to the optional fields, the execution UID is "root" (as specified in FIG. 3). In this example, the execution UID is controlled at the program level (e.g., specified in the program definition) and, accordingly, cannot be changed within the entity definition. Similarly, the forced option for the entity definition is "-display ${OPTIONS}:0.0" which is also controlled at the program level. The entity definition also includes granted options suntzu and localhost (i.e. a request from the entity is only granted the right to transmit suntzu or localhost as options and any different option is a policy violation resulting in a denied request). Finally, in this example, the source label/zone is specified as admin_high and the dest. label/zone is specified (at the program level) as public. No privileges explicitly are specified. Accordingly, the commands are executed using root privileges.

Using the above entity definition, only entities in a global container with an admin_high label may request execution of the "term.pub" in a non-global container with a public label. Said another way, the source of the request must be from a global container with an admin_high label and the xterm (which services the request) is located in a non-global container with the label "public." Further, in this example, the only two valid commands that the requesting user may use to request execution of the "term.pub" application are: (i) "izarun-c term.pub-o localhost" or (ii) "izarun-c term.pub-o suntzu." Following source credentials verification, the forced options will be applied to the aforementioned commands to generate the following commands: (i) "/usr/bin/xterm-display localhost:0.0" or (ii) "/usr/bin/xterm-display suntzu:0.0." With respect to the policy, only "root" from the global zone can request this application, and it will execute as "root" only under the public label container.

FIG. 5 shows a GUI (500) for adding another entity in accordance with one or more embodiments of the invention. The GUI shown in FIG. 5 includes information for associating a second entity definition to the program definition described in FIG. 3. Specifically, the user name in the required fields is specified as "bjg." In the optional fields, the forced options are controlled at the program level and, as such, they are greyed out and cannot be changed in this GUI screen (see FIG. 3), the granted options are specified as "suntzu" and "localhost," the source label/zone is set as "internal ssc", the destination ("dest.") label/zone is controlled at the program level (see FIG. 3), and the privileges are all set at "basic." In one embodiment of the invention, basic privileges are more restrictive than root privileges (see FIG. 4). With respect to the execution context of the above commands, commands requested by "bjg" will execute under the "root" user id, but with restricted basic privileges.

Figure 6A:
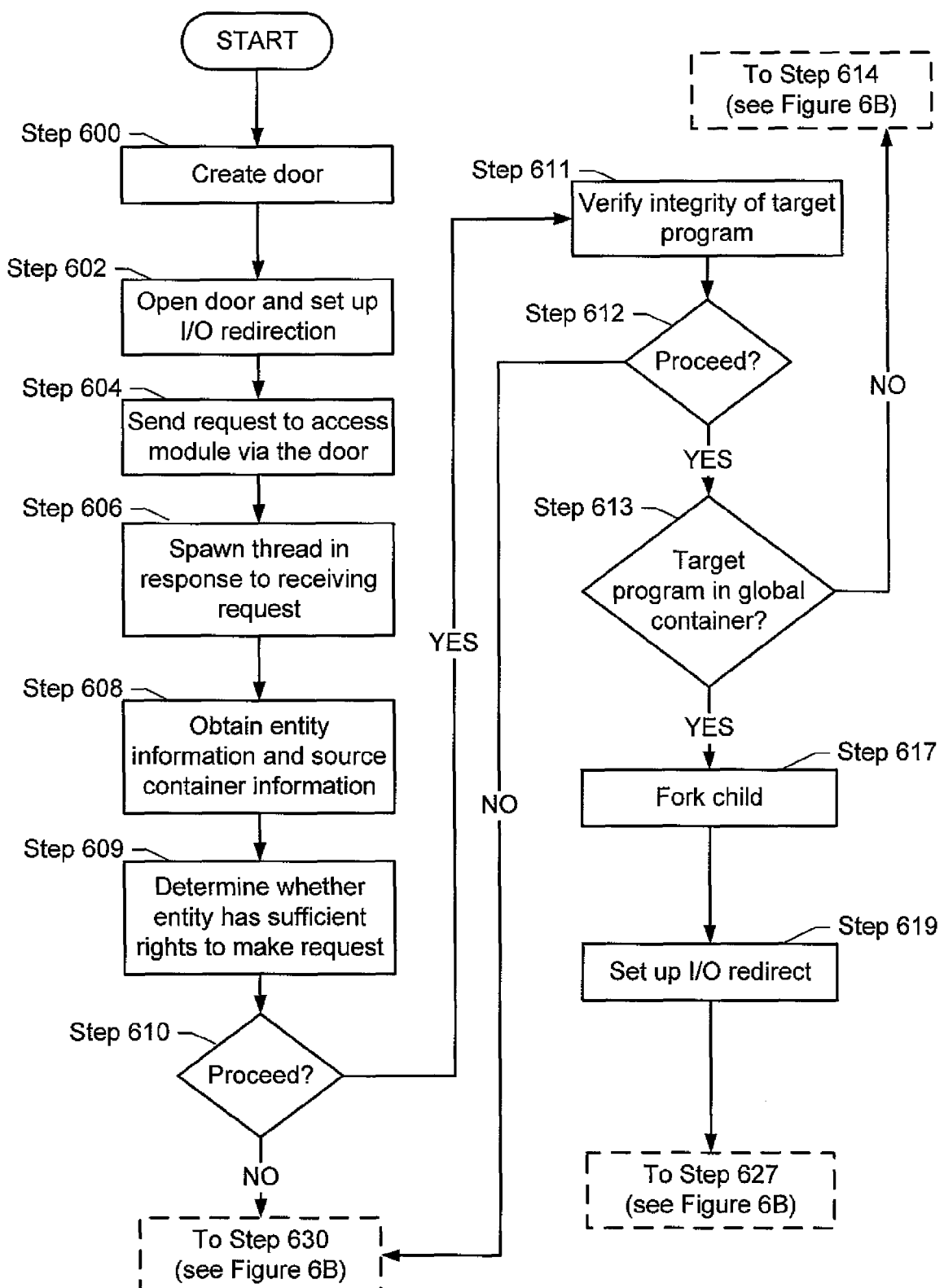
FIGS. 6A-6B show a flowchart in accordance with one or more embodiments of the invention.
Figure 6B:
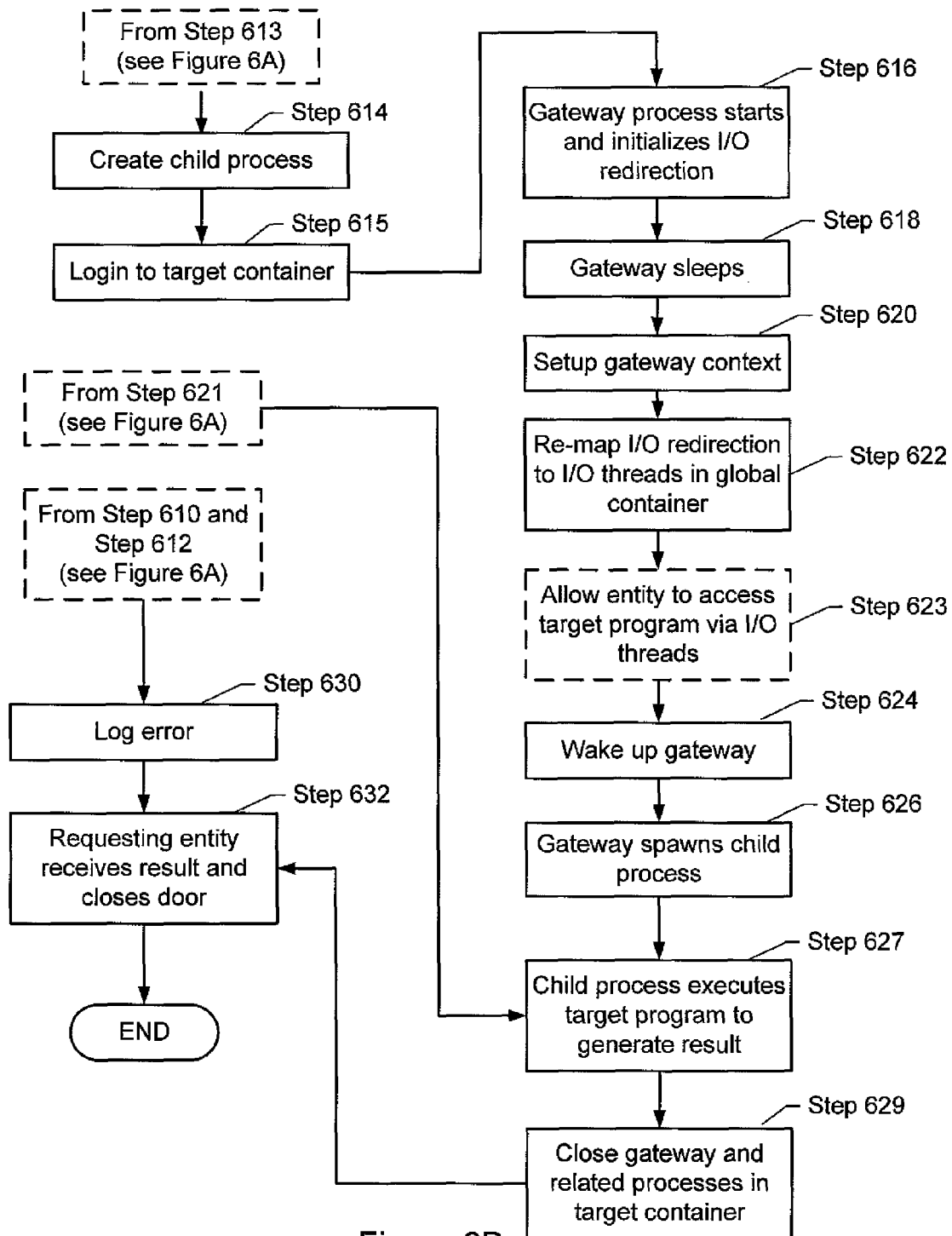

FIGS. 6A-6B show a flow chart in accordance with one or more embodiments of the invention. In one or more embodiments of the invention, one or more of the steps shown in FIGS. 6A-6B may be omitted, repeated, and/or performed in a different order. Accordingly, embodiments of the invention should not be considered limited to the specific arrangement of steps shown in FIGS. 6A-6B.

Turning to FIG. 6A, in Step 600, a door is created between the source container and the global container. In one embodiment of the invention, a door is created, and its associated special file is only made visible in the global zone and one specific source zone.

In Step 602, the door is opened and I/O redirection is set up. In one embodiment of the invention, opening the door includes identifying the door that bridges the source container and the global container. In one embodiment of the invention, setting up I/O redirection includes creating a communication mechanism, which maps I/O between the source container and global container. Examples of communication mechanisms include pipes and virtual terminals. I/O redirection using pipes is discussed below.

In Step 604, a request is sent from an entity (via a source program) using the door. In one embodiment of the invention, the request includes a command to execute on a target program in a target container (i.e., the global container or another non-global container). In one embodiment of the invention, the request is made using a generic application name. The generic application name adds a layer of abstraction such that the requesting entity does not need to know the actual name of the target program.

In Step 606, the access module spawns a thread in the global container in response to receiving the request. In Step 608, the thread (i.e., the thread spawned in Step 606) obtains the requesting entity information and the source container information. In Step 609, the access module verifies whether the requesting entity has sufficient rights to make the request using the program and entity definitions and entity information and the source container information.

In Step 610, a determination is made about whether to proceed based on the determination made in Step 609. If the entity has sufficient rights to proceed, then the process proceeds to Step 611. If the entity does not have sufficient rights to proceed, then the process progresses to Step 630, shown in FIG. 6B.

Referring to FIG. 6B, in Step 630, the error is logged in the appropriate log file (as discussed above) and the process then proceeds to Step 632 (described below).

Returning to FIG. 6A, in Step 611, the integrity of the target program is verified. In one embodiment of the invention, verifying the target program includes verifying the integrity of the target program binary as well as verifying the information necessary to execute the target program listed in the program and entity definitions.

In Step 612, a determination is made about whether the target program was verified. If the target program was not verified, the process proceeds to Step 630, shown in FIG. 6B. If the target program was verified and may proceed, the process progresses to Step 613. In Step 613, the process bifurcates depending on the location of the target program. If the target program is located in global container the process proceeds to Step 617. If the target program is located in a non-global container, the process proceeds to Step 614, shown in FIG. 6B.

In Step 614, the thread spawned in Step 606 creates a child process. In Step 615, the child process created in Step 614 logs in to the target container. In Step 616, the gateway is initiated. In one embodiment of the invention, the gateway is a process executing in the target container under the appropriate execution user identification specified in the appropriate entity definition or program definition. In addition, the gateway process initializes I/O redirection between the gateway process and the global container using, for example, pipes or virtual terminals. In Step 618, the gateway sleeps. In Step 620, the access module verifies the gateway initialization in Step 616, retrieves the appropriate context and privilege information from the program definitions and entity definitions, applies the context and privilege information to the gateway.

In an alternate embodiment of the invention, the gateway may be created in the global container and migrated to the target container after Step 620 is complete. The migration may be accomplished through libproc calls and/or processing internal structure values modifications.

Returning to FIG. 6B, in Step 622, the gateway I/O redirection initialized in Step 616 is remapped so that the stdin, stdout, and stderr pipes are intercepted by corresponding I/O threads spawned by the access module. In Step 623, optionally, the I/O threads in the global container are mapped to corresponding I/O threads in the source container to allow the entity to directly interact with the target program. Said another way, the pipes created in Step 602 are bridged to the pipes created in Step 622. Step 623 may only occur if the program and/or entity definitions allow for such interaction. In Step 624 the gateway is woken up (i.e., resume execution). In Step 626, the gateway spawns a child process to execute the target program. The gateway's child process has the same execution context as the gateway.

In Step 627, the child process executes the target program to generate a response to the execution request. In Step 629, the gateway and the related processes are terminated. In Step 632, the requesting entity receives result and closes door. In one embodiment of the invention, the result corresponds to the result generated in Step 627. Alternatively, the result corresponds to the notification of an error, which was logged in Step 630.

Returning to FIG. 6A, in Step 617, the thread forks the process to create a child process. In Step 619, this child process sets up the I/O redirection. In one embodiment of the invention, the child process maps its I/O (e.g. stdin, stdout, and stderr) to read/write to the corresponding pipes created by the thread spawned in Step 606. The process then proceeds to Step 627.

As discussed above, I/O is redirected between the requesting program and the access module and between the access module and the target program. In one embodiment of the invention, the I/O redirection is implemented using pipes. The following is brief description of an example of how pipes may be used to communicate I/O between the source program and target program.

Turning to the example, the source program creates three named pipes (stdin, stdout, and stderr) located in a temporary directory in the source container. Each of the pipes is associated with an I/O thread. The I/O threads are used to monitor the corresponding pipes, write data to the pipes, and read data from the pipes. The pipes in the source container allow the source program to interact with the access module in the global container.

In this example, the thread also creates three named pipes (e.g., stdin, stdout, and stderr) located in a temporary directory in the target container. Each of the pipes is associated with an I/O thread. The I/O threads are used to monitor the corresponding pipes, write data to the pipes, and read data from the pipes. The pipes in the target container allow the target program to interact with the access module in the global container. The I/O threads associated with the pipes are located in the global container and under the control of the access module.

The two sets of pipes may be bridged by the access module (or more specifically, the I/O threads controlled by the access module) to enable the source program and the target program to interact. In addition, because the I/O threads associated with the pipes created by the target program are controlled by the access module, the access module may implement a policy to filter content on the pipes. For example, data written to the stdout pipe by the target program is received by the corresponding I/O thread associated with the access module. The access module may then make a determination (using the policy definition(s)) about whether the data is to be written to the stdout pipe in the source container. If the access module determines that the data can be communicated to the source program, the data is written to the stdout pipe that bridges the source container and the global container. Similar filtering is performed on the other pipes.

Figure 7:
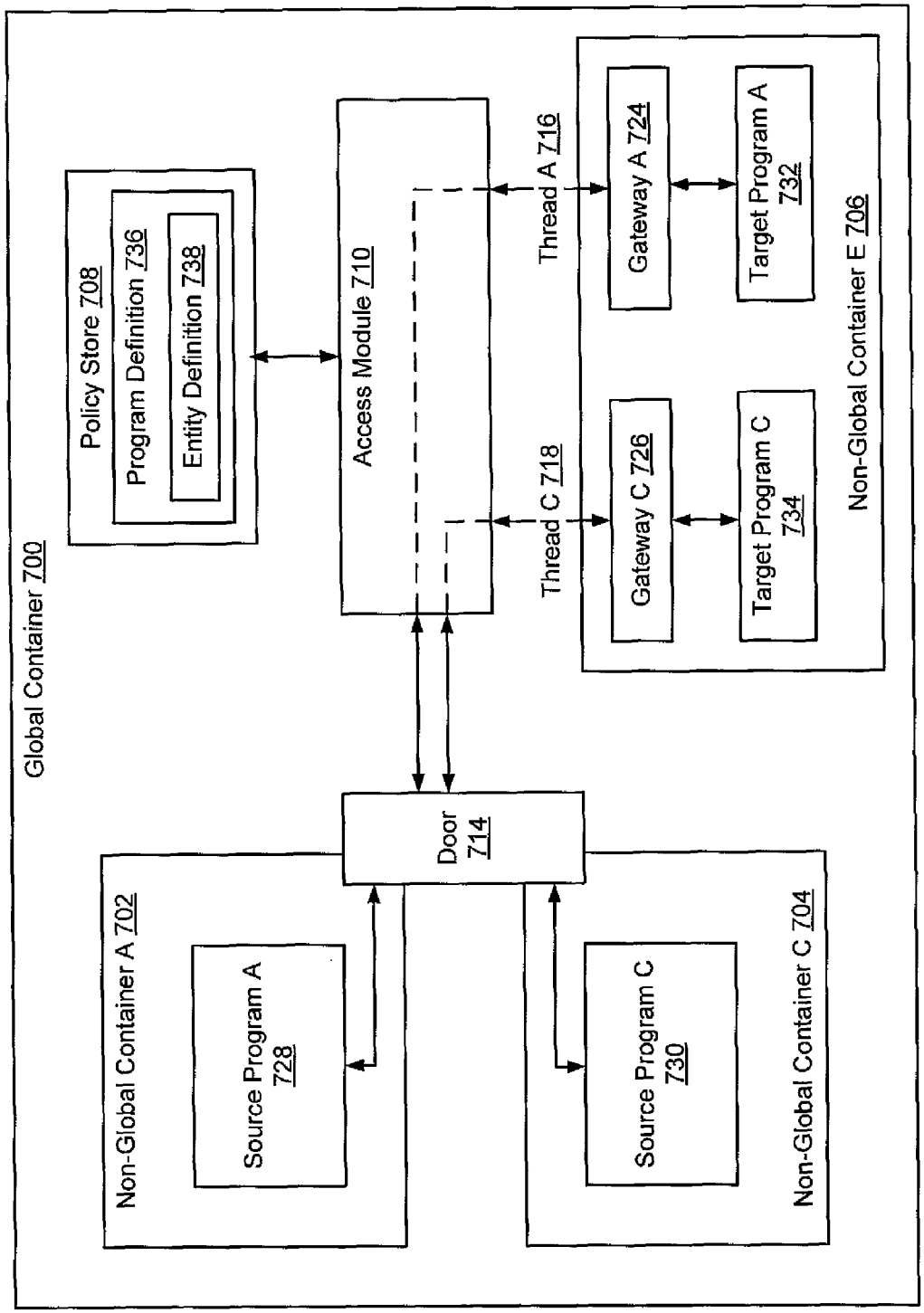
FIG. 7 shows a first example in accordance with one or more embodiments of the invention.

FIG. 7 shows a first example in accordance with one embodiment of the invention. The example is not intended to limit the scope of the invention. Turning to the example, it describes a scenario in which two requests, generated in two distinct non-global containers, are attempting to execute respective target programs in a third non-global container.

Referring to FIG. 7, the global container (700) includes non-global container A (702), non-global container C (704), non-global container E (706), a policy store (708), and access module (710). Non-global container A (702) includes source program A (728), which is able to view a door (714). In this example, the global container (700) has granted sufficient rights to non-global container A (720) to view the door (714). Non-global container C (704) includes source program C (730), which is also able to view the door (714). The policy store (708) includes program definitions (736) and entity definitions (738). The program definitions (736) include definitions for target program C (734) and target program A (732) to execute in non-global container E (706).

In this example, a first entity (not shown) logs in to non-global container A (702), and generates a request to execute target program A (732) via source program A (728). This request opens a door (714) between the global container (700) and the non-global container A (702). The door is used to transmit the request to the access module (710). The access module (710) spawns a thread (not shown) to service the request. The access module (710), using Thread A, verifies that source program A (728) (or the first entity) has the appropriate access rights to execute the request in non-global container E (706) using the appropriate program definitions (736) and entity definitions (738) found in the policy store (708).

Based on verification of the access rights for source program A (728) (or the first entity), the access module (710) forks the previously generated thread to create a child (i.e., thread A (716)). Thread A (716) logs in to the target container (non-global container E (706)) and initiates the execution of gateway A (724). Once gateway A (724) is opened, the access module (710) updates the execution context of gateway A (724) to be consistent with the entity definition (738) and the policy definition (736). Gateway A (724) subsequently executes target program A (732) and return results to source program A (728) via thread A (716).

In one or more embodiments of the invention, if program definitions (736) and entity definitions (738) permit I/O redirection, then I/O redirection may be initialized between source program A (728) and target program A (732) using, for example, pipes as discussed above.

In this example, a second entity (not shown) logs in to non-global container C (704), and generates a request to execute target program C (734) via source program C (730). This request opens the door (714) between the global container (700) and the non-global container C (704). The door is used to transmit the request to the access module (710). The access module (710) spawns a thread (not shown) to service the request. The access module (710), using Thread C (718), verifies that source program C (730) (or the second entity) has the appropriate access rights to execute the request in non-global container E (706) using the appropriate program definitions (736) and entity definitions (738) found in the policy store (708).

Based on verification of the access rights for source program C (730) (or the second entity), the access module (710) forks the previously generated thread to create a child (i.e., thread C (718)). Thread C (718) logs in to the target container (non-global container E (706)) and initiates the execution of gateway C (726). Once gateway C (726) is opened, the access module (710) updates the execution context of gateway C (726) to be consistent with the entity definition (738) and the policy definition (736). Gateway C (726) subsequently executes target program C (734) and return results to source program C (730) via thread C (718).

In one embodiment of the invention, the requests from the non-global containers are handled separately by the access module. Further, the execution context of the target programs within non-global container E are based on the execution context of the target gateway as defined by the access module.

FIGS. 8A-8C show a second example in accordance with one or more embodiments of the invention. This example is not intended to limit the scope of the invention.

Referring first to FIG. 8B, FIG. 8B shows a program definition for target program A. In this example, the program definition includes several fields, some of which are required and some of which are optional. The required fields are: (i) program name, (ii) executable path, and (iii) program MD5 (i.e., the message digest of the target program binary). In an alternative embodiment of the invention, the program MD5 could specify a different cryptographic hash function, such as SHA-1. SHA-1 and MD5 are example cryptographic hash functions but one skilled in the art will appreciate that the invention is not limited to these examples. The program name is used by the source program to request execution of the target program. The executable path includes the path to the target program, and the program MD5 is the message digest of the target program binary obtained using the Message Digest (MD) 5 algorithm.

Continuing with FIG. 8B, the optional fields are: (i) source container, (ii) destination container, (iii) forced options, (iv) granted options, (v) execution UID, (vi) execution privileges, and (vii) granted entities. The source container specifies the name of the source container from which the target program may be requested. The destination container specifies the name of the destination container in which the target program is executing (or will be executed). Both the source and destination containers may be either global or non-global containers. The forced options field includes options that are added by the access manager when the program is executed. The granted options field (blank in FIG. 8B) may include options for the source program to send to the target program. Options sent by a source program that are not listed in the granted options field will be denied. The execution UID field includes the user UID on behalf of which the target program is run. The execution UID may be associated with a default set of execution privileges. However, this default set of execution privileges may be modified based on the content of the execution privileges field (blank in FIG. 8B). Specifically, the execution privileges field specifies a list of privileges that are granted or removed from the default execution privileges associated with the execution UID. The final field in the program definition is the granted entities field. This field lists entities that are allowed to request program execution.

Based on the program definition shown in FIG. 8B, requests to execute a program named "term.ts" require that the program have a matching executable of "/usr/bin/xterm" with a MD5 value of "0cd3ea9947b124c0eadd1c8d4ebea5c0." Further, such a request can only be made from a source container with the label "secret" and the program may only be executed in a destination container with the label "top secret." Forced options have been defined as "-display $ {OPTIONS}:0.0" and granted options have not been defined, meaning any options will be granted. Finally, with respect to the execution context, the target program will be executed using execution UID "root" with root access privileges.

The following is an example request, which satisfies the program definition shown in 8B: "izarun-c term.ts-o localhost." In this example, the source program is named izarun and the request is written using the following syntax of "izarun-c <application_name>-o <options>."

FIG. 8C shows entity definitions in accordance with one embodiment of the invention. Specifically, there are two entity definitions for user A and one entity definition for user B. In this example, all entity definitions are associated with target program A. With respect to user A, the first entity definition (801) provides the following information: (i) non-global container A is the source container; (ii) non-global container E is the destination container; (iii) an application command; (iv) an execution UID of "root"; (v) granted options of local host and suntzu; and (vi) admin level privileges. Accordingly, user A can send a request to target program A because the request is made from non-global container A and target program A exists in non-global container E. These associations between containers and labels and/or zones are defined by the policy store. If the scenario satisfies policy store definitions and conforms with the access module, the request may be executed by target program A where the request is executed using execution UID of "root" with admin level privileges.

With respect to the second entity definition for user A, the second entity definition (803) provides the following information: (i) non-global container C is the source container; (ii) non-global container E is the destination container; (iii) an application command; (iv) an execution UID of "root"; (v) granted option of localhost; and (vi) root level privileges (in this example root level privileges are higher than admin level privileges). Accordingly, user A can send a request to target program A because the request is made from non-global container C and target program A exists in non-global container E. If the scenario satisfies policy store definitions and conforms with the access module, the request may be executed by target program A where the request is executed using execution UID of "root" with global level privileges.

With respect to the entity definition for user B, the entity definition (805) provides the following information: (i) non-global container A is the source container; (ii) non-global container E is the destination container; (iii) an application command; (iv) an execution UID of "usrname"; (v) granted option of localhost; and (vi) basic level privileges (in this example basic level privileges are lower than admin level privileges). Accordingly, user C can send a request to target program A because the request is made from non-global container A and target program A exists in non-global container E. If the scenario satisfies policy store definitions and conforms with the access module, the request may be executed by target program A where the request is executed using execution UID of "usrname" with basic level privileges.

Referring to FIG. 8A, using the aforementioned program and entity definitions, consider the situation in which users A and B attempt to access target program A (826) in non-global container E (806) via source program A (822) in non-global container A (802). For the purposes of this example, non-global container A (802) is associated with the label "secret" and non-global container E (806) is associated with the label "top secret," where "top secret" is a higher (more sensitive) security level than "secret."

If user A attempts to send a request in accordance with the command listed in 8B to target program A (826) via the door (814) and gateway (820), the access module (810) reviews the program definition (828) and corresponding entity definitions. In this example, this request satisfies the program definition (FIG. 8B) as the source and destination containers include the appropriate labels. The access module (810) subsequently checks the appropriate entity definitions. In this example, the request satisfies entity definition (801) and, as such, the request is allowed to proceed to target program A (826). The execution context of the gateway (820) in this example is a "root" with administrative level privileges. (Assuming that the execution UID is controlled at the program level).

If user B attempts to send a request in accordance with the command listed in 8B to target program A (826) via the door (814) and gateway (820), the access module (810) reviews the program definition (828) and corresponding entity definitions. In this example, this request satisfies the program definition (FIG. 8B) as the source and destination containers include the appropriate labels. The access module (810) subsequently checks the appropriate entity definitions. In this example, the request satisfies entity definition (803) and, as such, the request is allowed to proceed to target program A (826). The execution context of the gateway (820) in this example is a "usrname" with basic level privileges. (Assuming that the execution UID is controlled at the entity level).

If user A attempts to send a request in accordance with the command listed in 8B to target program A (826) via the door (814) and gateway (820), the access module (810) reviews the program definition (828) and corresponding entity definitions. In this example, this request does not satisfy the program definition (FIG. 8B) as the source and destination containers do not include the appropriate labels. Similarly, if user B attempts to send a request in accordance with the command listed in 8B to target program A (826) via the door (814) and gateway (820), the access module (810) reviews the program definition (828) and corresponding entity definitions. In this example, this request does not satisfy the program definition (FIG. 8B) as the source and destination containers do not include the appropriate labels.

In one embodiment of the invention, the access module may also be used to control access to non-global containers residing in a common non-global container. In one embodiment of the invention, the invention provides a method and system for controlling access between various non-global containers, where the granularity of the access control is based on program definitions, entity definitions, and container labels. Further, the access control allows entities with a lower level of access (e.g., public level access) to sends requests to containers requiring a higher level of access (e.g., top secret level access).

Those skilled in the art will appreciate that while the above invention is described with respect to containers, that the invention may be applied to other virtualization technologies such as Xen®. More specifically, the Xen® virtualization project allows for multiple guest operating systems executing in a host operating system. Thus, Xen® supports execution of multiple operating system images (i.e., guest operating systems) on a host operating system. Xen® is a trademark overseen by the Xen Project Advisory Board. Those skilled in the art appreciate that the invention may be applied to other virtualization technologies in addition to zones and Xen®.

Figure 9:
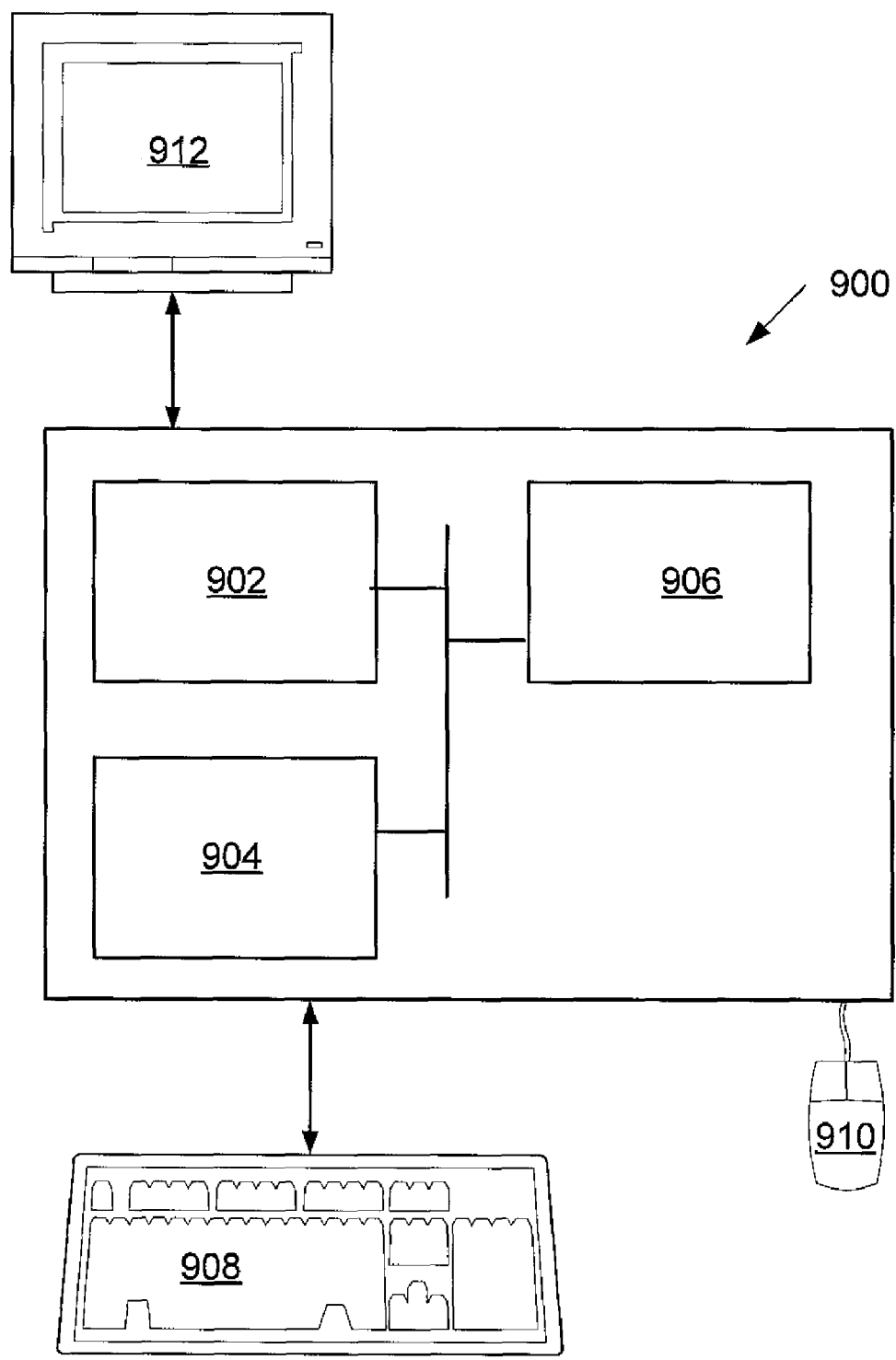
FIG. 9 shows a computer system in accordance with one or more embodiments of the invention.

The invention (or portions thereof), may be implemented on virtually any type of computer regardless of the platform being used. For example, as shown in FIG. 9, the computer system (900) may include a processor (902), associated memory (904), a storage device (906), and numerous other elements and functionalities typical of today's computers (not shown). The computer may also include input means, such as a keyboard (908) and a mouse (910), and output means, such as a monitor (912). The computer system (900) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system may be located at a remote location and connected to the other elements over a network. Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for executing a target program, comprising:
   opening, by a hardware processor and in response to a request from a source program, a door between a source container and a global container,
      wherein the source container is controlled by the global container,
      wherein the request specifies a target program, and
      wherein the source container comprises the source program;
   sending the request to an access module located in the global container using the door;
   verifying, by the hardware processor, that the request can be executed in a target container using a policy definition, wherein the target program is in the target container and wherein the target container is controlled by the global container;
   logging in to the target container after the request has been verified;
   initiating a gateway within the target container in response to the login;
   setting an execution context of the gateway based on the policy definition; and
   executing the target program by the hardware processor, using the execution context, to generate a response to the request,
      wherein the global container is executed by an operating system,
      wherein the global container comprises the source container, the target container, the door, and the access module,
      wherein the global container, the source container, and the target container are isolated execution environments, and
      wherein the door is an inter-process communication mechanism.

2. The method of claim 1, further comprising:
   spawning, in response to receiving the request, a thread in the global container by the access module, wherein the thread verifies that the request can be executed in the target container using the policy definition.

3. The method of claim 1, wherein the policy definition comprises at least one selected from a group consisting of a program definition and an entity definition.

4. The method of claim 2, further comprising:
   prior to initiating the gateway in the container, verifying a gateway executable for the gateway by the thread.

5. The method of claim 2, wherein a child process of the thread logs into the target container after the request has been verified.

6. The method of claim 3, wherein the program definition comprises a name of the target program, a name of the source container, and a name of the target container.

7. The method of claim 3, wherein the program definition comprises a name of the target program, a label of the source container, and a label of the target container.

8. The method of claim 3, wherein the entity definition comprises a name of an entity in the source container, a name of the target program, a name of the source container, and a name of the target container.

9. The method of claim 3, wherein the entity definition comprises a name of an entity in the source container, a name of the target program, a label of the source container, and a label of the target container.

10. The method of claim 4, wherein the gateway is verified using a checksum function.

11. The method of claim 6, wherein the program definition further comprises an execution identification, wherein the execution identification is used to login to the target container.

12. The method of claim 7, wherein the label of the source container is less restrictive than the label of the target container.

13. The method of claim 8, wherein the entity definition further comprises a forced option and wherein the forced option is added to the request.

14. A non-transitory computer readable medium comprising executable instructions to perform a method when executed by a processor, the method comprising:
   opening, in response to a request from a source program, a door between a source container and a global container,
      wherein the source container is controlled by the global container,
      wherein the request specifies a target program, and
      wherein the source container comprises the source program;
   sending the request to an access module located in the global container using the door;
   verifying that the request can be executed in a target container using a policy definition, wherein the target program is in the target container and wherein the target container is controlled by the global container;
   logging in to the target container after the request has been verified;

initiating a gateway within the target container in response to the login;

setting an execution context of the gateway based on the policy definition; and executing the target program, using the execution context, to generate a response to the request, wherein the global container is executed by an operating system, wherein the global container comprises the source container, the target container, the door, and the access module, wherein the global container, the source container, and the target container are isolated execution environments, and wherein the door is an inter-process communication mechanism.

15. The non-transitory computer readable medium of claim 14, the method further comprising:

spawning, in response to receiving the request, a thread in the global container by the access module, wherein the thread verifies that the request can be executed in the target container using the policy definition, and wherein the policy definition comprises at least one selected from a group consisting of a program definition and an entity definition.

16. The non-transitory computer readable medium of claim 14, wherein the method further comprises:

prior to initiating the gateway in the container, verifying a gateway executable for the gateway by the thread.

17. The non-transitory computer readable medium of claim 15, wherein the program definition comprises one selected from a group consisting of: (a) a name of the target program, a name of the source container, and a name of the target container; and (b) a name of the target program, a label of the source container, and a label of the target container.

18. The non-transitory computer readable medium of claim 15, wherein the entity definition comprises one selected from a group consisting of: (a) a name of an entity in the source container, a name of the target program, a name of the source container, and a name of the target container; and (b) a name of an entity in the source container, a name of the target program, a label of the source container, and a label of the target container.

19. The non-transitory computer readable medium of claim 16, wherein the gateway is verified using a checksum function.

20. A system, comprising:

a hardware platform comprising a processor;

an operating system executing on the hardware platform; and a global container executing on the operating system, wherein the global container comprises a first container, a second container, a door, and an access module, wherein the second container comprises a target program, wherein the first container comprises a source program configured to send a request for the target program to the access module via the door, wherein the access module, using a policy definition, is configured to enable the target program to process the request, wherein the policy definition comprises at least one selected from a group consisting of a program definition and an entity definition, wherein the global container, the first container, and the second container are isolated execution environments, and wherein the door is an inter-process communication mechanism.

* * * * *